UNITED STATES PATENT OFFICE.

WILLIAM B. HILL, OF KANSAS CITY, MISSOURI.

METHOD OF MAKING CEMENT.

1,017,211. Specification of Letters Patent. Patented Feb. 13, 1912.

No Drawing. Application filed September 25, 1909. Serial No. 519,650.

*To all whom it may concern:*

Be it known that I, WILLIAM B. HILL, a citizen of the United States, residing at Kansas City, in the county of Jackson and State of Missouri, have invented certain new and useful Improvements in Methods of Making Cement, of which the following is a specification.

In the manufacture of what is commonly termed "Portland" cement one of the most important requisites is that the alkaline base,—which is commonly lime, or chalk, and the acid substance (which is commonly clay), containing the requisite silica and alumina, should be thoroughly and uniformly incorporated previous to the clinkering of the mass. There have been many modes and devices for commingling such materials previous to clinkering; in some processes limestone has been burned, ground, and mechanically mixed with previously prepared clay, or other suitable material, or combinations thereof, and water; and the resultant mass or slurry has been subsequently burned in suitable furnaces or kilns to clinker; and such clinker afterward reduced to powder by suitable grinding or stamping mills. In such processes the reduction and admixture of the materials prior to clinkering is entirely mechanical, and it results that all the clinker is not uniform in its constituents, and the resultant cement varies in quality. In some cases the slurry, or mechanically mixed mass, is dried and briqueted before it is introduced into the kiln;—such prior drying and briqueting hastening the formation of the clinker and lessening the amount of fuel required to produce it.

The crushing and grinding of the limestone and other materials preparatory to the mechanical mixing thereof is expensive, and various attempts have been made to lessen this expense. In one process unground lime and marl have been mixed before pulverization; the unslaked lime absorbing the moisture in the marl and facilitating the subsequent grinding of the limestone and marl preparatory to mechanically mixing them; and the subsequent clinkering thereof. In such process the expensive step of mechanical reduction of the lime and marl to powder prior to the burning must still be performed; there not being sufficient moisture or water in the marl to hydrate the lime, and consequently the mixture of the material is practically entirely mechanical, and the chemical combination of elements is incomplete and not uniform, and the resultant cement varies in quality. It has also been proposed to mix incandescent lime and clay, or other suitable material; place such mixture in a closed vessel, or muller and subject it while mechanically agitated to the action of steam or air and mechanical pulverizers so as to reduce and combine the materials.

One of the principal objects of my invention is to do away with the costly and troublesome steps of grinding the limestone, and the clay, or other suitable substance, preparatory to mixing the same; as by so doing I can obviously greatly reduce the cost of producing Portland cement.

Another object of the invention is to utilize to the fullest extent the natural chemical properties of the material of which the cement is to be composed in effecting the disintegration and uniform commingling of such materials, by and during the chemical reactions resulting from the hydration of the quicklime at a certain critical point in the process, and thereby reduce the materials to a powdered intimately combined condition suitable for immediate clinkering if desired.

I accomplish these objects in a practical and simple manner by the present invention which resides in the novel process of reducing and mixing the materials for the cement preparatory to the clinkering thereof.

The preferred mode of carrying out my invention is as follows: I first take a suitable quantity of clay or shale, containing the elements (silica, alumina, etc.) that must be combined with lime (CaO) to make "Portland" cement; the quantities depending upon the constituents of the materials as determined by exact chemical analysis;—and then add thereto a predetermined amount of water, and preferably stir or agitate the mixture until the material and water are mechanically combined in a substantially uniform mixture in which the clay or shale in a finely divided state is held in suspension in the water. I then add to such mixture a predetermined quantity of calcium oxid or quicklime (CaO) with the result that the lime is hydrated by the water in such mixture and the water absorbed or evaporated, the calcium oxid being changed to a calcium hydrate; and during, and by reason of, such chemical process of hydration of the lime, the clay or shale formerly held in suspension become inseparably and intimately combined with the lime, and reduced to a finely divided state and intimately mixed: and the resultant product is a fine powdery mass practically uniform in constituents throughout.

When the quick lime is added to the above mixture, (which must possess a predetermined and proper amount of water) the effect is to produce a chemical change, viz: a complete hydration of the lime; the calcium oxid being changed to a calcium hydrate: the result is that the lime is reduced, in hydrate form, to an impalpable powder and by and during the process of hydration of the lime in the mixture of pulverized clay and water, there is produced an affinity between the particles of clay and the lime hydrate,—the lime acting as a binder between the two, causing an intimate, uniform and perfect mixture thereof. I thus obtain a more intimate mix or thorough incorporation of the materials for Portland cement than is possible in any of the heretofore known modes of manufacturing such cement. This powdery product may be then clinkered in a suitable furnace or kiln, and the clinker afterward reduced to an impalpable powder by the usual means, the ultimate product being an efficient cement of high grade and very uniform quality.

In making the very highest grades of cement I may, after the hydration of the materials is completed as above described, pass the resultant powder through a grinder to insure absolute reduction of every particle thereof to an impalpable powder; after which it can,—with or without the addition of gypsum or other materials, as desired,— be clinkered and subsequently pulverized.

In some cases the clay, or shale, and quicklime in proper quantities, (as predetermined by chemical analysis) may be mixed dry; then a predetermined quantity of water, just sufficient to cause complete hydration of the lime, is added to the mixture,— and by, and during, the chemical process of hydration of the lime all the materials are reduced to powder, and at the same time thoroughly and intimately commingled.

In some cases it may be desirable to reduce the clay, or shale, to a certain degree of fineness before it is mixed, either in suspension or dry, with the quicklime, as above stated. In any case the amount of water used should be sufficient to hydrate the lime but not to saturate it the resultant powdery product may, either with or without further pulverization, be burned to a clinker; and if desired gypsum, or other suitable material, may be added to the clinker; prior to the final pulverization thereof. When such clinker, or combination of clinker and gypsum or other appropriate material, is reduced to an impalpable powder by the usual means, it forms a very high and uniform grade of Portland cement.

In the practical utilization of the invention I prefer, as above stated, to take the proper predetermined quantities of clay, or shale material containing the requisite silica, alumina, etc., as determined by exact chemical analysis, and add thereto a sufficient amount of water to produce a mixture in which such materials are suspended in just enough water to entirely hydrate the necessary amount of quicklime, which is to be added thereto. Then by adding to this mixture the predetermined quantity of quicklime the mass is reduced, by and during the chemical process of hydration of the lime, to an impalpable combined powder which is afterward burned to clinker, and pulverized in the usual manner.

I have found that Portland cement produced by the above described process, is a more perfect product and can be produced at much less expense than by the heretofore known processes; and my invention has the following advantages over the old processes; first, it results in a superior pulverization or reduction of the materials and a more perfect mixture thereof prior to clinkering; second, it saves expense of crushing material; third, it economizes fuel; fourth, it increases the output of the kilns or rotary clinker furnaces and also increases the output of the grinders, because of the uniformity of the material; and fifth, the resultant Portland cement is more uniform in strength and lighter in color.

I claim:

1. The herein described process of making Portland cement, consisting in mixing predetermined quantities of clay or shale, and quick-lime and water, the water and quick-lime being in such proportions as will effect disintegration of the clay and complete hydration of the lime in said mixture and reduce the mixture during the hydration of the lime to a fine powdery mass; then clinkering such powdery mass; and finally pulverizing the clinker.

2. The improved process of making Portland cement, consisting in mixing predetermined quantities of clay or shale, with sufficient water to disintegrate the clay or shale and suspend it in the water; then adding to said mixture such a quantity of quick-lime as will absorb, by and during the process of hydration, all of the water in the mixture and reduce the mass to a dry powdery, condition; the lime and materials being intimately mixed by and during the process of hydration of the lime and the resultant mass being practically uniform in constituents; then clinkering such mass; and finally pulverizing the clinker.

In testimony whereof I affix my signature, in presence of two witnesses.

WILLIAM B. HILL.

Witnesses:
  J. F. POLLOCK,
  JESTER T. FUNSERLAND.